United States Patent Office 3,686,106
Patented Aug. 22, 1972

3,686,106
ROOM TEMPERATURE CURING
FOUNDRY BINDER
Richard B. Tideswell, Buffalo, and Jonathan A. Stone, Williamsville, N.Y., assignors to Hooker Chemical Corporation, Niagara Falls, N.Y.
No Drawing. Filed Mar. 25, 1970, Ser. No. 22,666
Int. Cl. C08j 5/20
U.S. Cl. 260—19 A
7 Claims

ABSTRACT OF THE DISCLOSURE

A room temperature curing foundry binder is provided comprising (A) a resinous component comprising a mixture of (1) an oil modified hydroxyalkylated novolac resin, (2) an unsaturated petroleum polymer and (3) a solvent, and (B) an organic polyisocyanate.

BACKGROUND OF THE INVENTION

Resin binders used in the production of foundry molds and cores are generally cured at high temperatures to achieve the fast curing cycles required in foundries. However, the industry has been seeking resin binders that cure at low temperature, or even at room temperature, to avoid the necessity for high temperature curing operations which have higher energy requirements and often result in the production of obnoxious fumes. One important property of foundry binders is the speed with which the foundry molds or cores break down when metal is ultimately poured against them. Generally, the faster the cores break down, the more valuable the binder. In the ideal system, the mold or core would break down immediately after the metal is poured. The present invention provides a foundry binder which is capable of air drying at room temperature and which exhibits improved break-down properties.

Accordingly, it is the object of the invention to provide a binder for foundry sand that is capable of curing at low temperatures, even at room temperature, i.e., about 30° centigrade. Another object of the invention is to provide foundry binders that have a fast curing cycle at these low temperatures. A further object is to provide a foundry binder which has improved breakdown properties.

SUMMARY OF THE INVENTION

This invention relates to room temperature curing foundry binders. More particularly, the invention relates to a room temperature curing foundry binder comprising (A) a resinous component comprising a mixture of (1) an oil modified hydroxyalkylated novolac resin, (2) an unsaturated petroleum polymer, and (3) a solvent and (B) an organic polyisocyanate. The invention relates also to the preparation of the foundry binders and to the foundry molds or cores employing the binder.

DESCRIPTION OF THE PREFERRED EMBODIMENTS

The resinous component of the binder is a mixture of an oil modified hydroxylated novolac resin, an unsaturated petroleum polymer and a solvent. The resinous component generally has a reactivity number of about 50 to about 125 milligrams of potassium hydroxide per gram of resin, preferably, about 80 to about 120 milligrams of potassium hydroxide per gram of resin and an iodine number of about 50 to about 125, preferably from about 80 to about 120.

The hydroxyalkylated resins are of the formula:

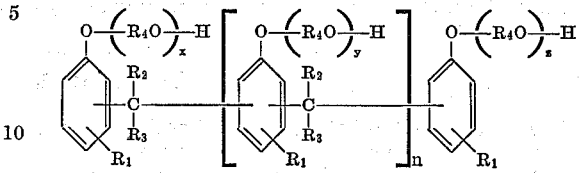

wherein $n$ has an average value of about 0.2 to 6, preferably about 0.5 to 3;

$x$, $y$ and $z$ are integers from 1 to about 25; preferably 1 to about 10;

$R_1$ is independently selected from the group consisting of hydrogen, fluorine, chlorine, bromine, hydrocarbon radical, hydrocarbon ketone radical, and hydrocarbon carboxylic radical;

$R_2$ and $R_3$ are independently selected from the group consisting of hydrogen, a hydrocarbon radical, and a halogen-substituted hydrocarbon radical; and $R_4$ is a radical derived from a compound selected from the group consisting of a monooxirane ring compound, an alkylene halohydrin and an alkylene carbonate by an oxyalkylation reaction. These resins are prepared by reacting together a fusible, organic solvent soluble condensation product of a phenol and an aldehyde or ketone containing condensate units having reactive phenolic hydroxyl groups, with a substance reactive with the phenolic hydroxyl groups and selected from the group consisting of mono oxirane ring compounds, alkylene halohydrins, alkylene carbonates, and mixtures thereof. The condensation product can also be prepared by first reacting the phenol with the substance reactive with the phenolic hydroxyl group, and thereafter condensing the modified phenol with an aldehyde or ketone.

Fusible, organic solvent soluble condensation products of a phenol and an aldehyde or ketone suitable for use as starting materials in practicing the invention are well known to the art and can be prepared by well known methods. The phenol-aldehyde or phenol-ketone condensate should be soluble in organic solvents such as acetone and it should not be advanced to the insoluble C stage or resite stage. When the phenol is phenol itself and the aldehyde is formaldehyde, one type of condensation which is highly satisfactory contains condensation units which can be exemplified by the following formula:

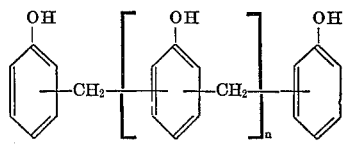

wherein $n$ has an average value of about 0.2 to 6, and often higher provided the resin is fusible and acetone or organic solvent-soluble. Preferably, the phenol-aldehyde condensate is a novolac, which contains more than one mole or phenol per mole of aldehyde or ketone.

Examples of phenols which can be used in preparing phenol-aldehyde condensates for use in practicing the invention include phenol itself or substituted phenols, wherein at least about half the substituted phenols have at least two of the ortho and para positions of the phenol nucleus available for condensation (unsubstituted). Such phenols have the following general formula:

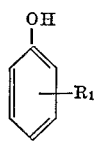

where $R_1$ can be H, F, Cl, Br or a suitable substituent selected from the following:

(a) Alkyl and alkenyl groups of one to eighteen carbon atoms in any of their isomeric forms and substituted on the phenolic nucleus in the ortho, meta or para positions;

(b) Alicyclic groups of five to eighteen carbon atoms such as cyclohexyl, cyclopentyl, methyl cyclohexyl, butylcyclohexyl, and the like;

(c) Aromatic or aralkyl groups of six to eighteen carbon atoms such as phenyl, alpha-methyl benzyl, benzyl, cymyl, and the like;

(d) Alkyl, alkenyl, alicyclic, aryl and aralkyl ketones wherein the hydrocarbon is defined hereinbefore;

(e) Alkyl, alkenyl, alicyclic, aryl and aralkyl carboxylic groups wherein the hydrocarbon is defined hereinbefore and mixtures thereof. As indicated, the hydrocarbon radicals preferably have one to eighteen carbon atoms.

Suitable substituted phenols include the following:

para-tertiary-butylphenol,
para-chlorophenol,
para-tertiary hexylphenol,
para-isooctylphenol,
para-phenylphenol,
para-benzylphenol,
para-cyclohexylphenol,
para-octadecyl-phenol,
para-nonylphenol,
para-beta-naphthyl-phenol,
para-alpha-naphthyl-phenol,
cetyl-phenol,
para-cumyl-phenol,
para-hydroxy acetophenone,
para-hydroxybenzophenone, a phenol alkylated with limonene, a phenol alkylated with oleic acid, as well as the corresponding ortho and meta derivatives such as meta-butyl phenol and ortho-butyl phenol, as well as mixtures thereof.

Aldehydes or ketones or mixtures thereof capable of reacting with a phenol are satisfactory, provided the aldehydes or ketones do not contain a functional group or structure which is detrimental to the condensation reaction or with oxyalkylation of the condensate. The preferred aldehyde is formaldehyde, which can be in aqueous solution or in any of its low polymeric forms such as paraform or trioxane. The aldehyde preferably contain one to eight carbon atoms. Other examples include acetaldehyde, propionaldehyde, butyraldehyde, benzaldehyde, furfural, 2-ethylhexanal, ethylbutyraldehyde, heptaldehyde, pentaerythrose, glyoxal, chloral, and the like. The ketones have the formula:

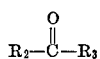

wherein $R_2$ and $R_3$ can be hydrogen or organic radicals. Examples of ketones are acetone, methyl ethyl ketone, diethyl ketone, methyl benzyl ketone, methyl cyclohexyl ketone, diallyl ketone, dichloromethyl ketone, as well as mixtures thereof. $R_2$ and $R_3$ preferably have 1 to 7 carbon atoms.

The ratio of aldehyde or ketone to the phenol (or oxyalkylated phenol) can be varied to prepare condensates of various molecular weights and viscosity of the final condensation product can be regulated by the molecular weight of the phenolaldehyde or phenol-ketone condensate. Preferably, the amount of aldehyde or ketone varies from 0.5 to 1.0 mole per mole of the phenol (or oxyalkylated phenol) when a mono- or difunctional pehnol is used. In instances where a trifunctional phenol is used, the preferred upper ratio of aldehyde or ketone is about 0.85 mole per mole of phenol (or oxyalkylated phenol). It is preferred that the aldehyde or ketone and phenol be reacted using an acid catalyst such as sulfuric, hydrochloric or oxalic acid, but basic catalysts also can be used. In some instances, catalysts are not necessary. Examples of alkaline catalysts include ammonia, amines and quaternary ammonium bases. Wetting agents of the anionic type such as sodium alkyl aryl sulfonate, can be used to speed up the reaction when weak acids are used.

The condensation products preferably contain substantially no free reactive phenolic groups, i.e., less than about 5%, but preferably less than about 0.5% of the phenolic hydroxyl groups present originally in the phenol-aldehyde or phenol-ketone condensate.

The preferred method hydroxyalkylation is by reaction with compounds containing a mono oxirane ring. Monomeric epoxides having two to eighteen carbon atoms are preferred. Examples of mono-epoxides that can be employed are ethylene oxide, propylene oxide, butylene oxide, cyclohexane oxide, 2,3-epoxyhexane, epichlorohydrin, styrene oxide, allyl glycidyl ether, methyl glycidyl ether, butyl glycidyl sulfide, glycidyl methyl sulfone, glycidyl methacrylate, glycidyl allyl phthalate, and the like. The preferred mono-epoxides are the mono-epoxide substituted hydrocarbons, the mono-epoxy-substituted ethers, sulfides, sulfones and esters wherein the said compounds contain two to eighteen carbon atoms. Minor amounts of diepoxides can also be incorporated into the compositions. Typical di-epoxides are 3,4-epoxy-6-methylcyclohexylmethyl-3, 4-epoxy-6-methylcyclohexanecarboxylate, dicyclopentadiene dioxide, limonene dioxide, 4,4′(diglycidyl) diphenylpropane, vinylcyclohexane dioxide. Many other epoxides can be used, but the alkylene oxides containing two to six carbon atoms are generally used. Mixtures of the foregoing compounds are very useful.

Catalysts for the reaction of the oxirane ring compounds and phenolic hydroxyl groups are alkali or alkaline earth hydroxides, primary amines, secondary amines, tertiary amines, or basic alkali salts. These include sodium, potassium, lithium, calcium, and barium hydroxides, amines such as methyl, dimethyl, diethyl, trimethyl, triethyl, tripropyl, dimethyl benzyl, dimethyl hydroxyethyl; dimethyl-2-hydroxypropyl and the like, and salts of strong bases and weak acids such as sodium acetate or benzoate. Combinations of catalysts can be used to excellent advantage in obtaining particular products. For example, an amine catalyst, such as triethyl amine can be used to add a mole of propylene oxide to each phenolic hydroxyl groups, and thereafter hydroxylalkylation can be continued with the ethylene oxide using as catalyst an alkali metal hydroxide, such as sodium hydroxide. In general, the hydroxyalkylation reaction can be carried out at 50 to 250 degrees centgrade. The hydroxyalkylation of the phenols is preferably performed at 50 to 150 degrees; the hydroxyalkylation of the phenolic condensates proceds at better rates at 150 to 250 degrees. Solvents are not normally preferred, although solvents can be used for the higher molecular weight resins to reduce viscosity.

The phenolic hydroxyl of the phenols or the phenolic condensates can also be hydroxyalkylated by reacting alkylene halohydrins with the phenolic hydroxyl using equivalent amounts of an alkali metal hydroxide to bring about the reaction. Suitabe alkylene halohydrins are ethylene chloro- or bromohydrins, propylene chloro- or bromohydrins, 2,3-butylene chloro- or bromohydrins, glyceryl chloro- or bromohydrins.

Another method for hydroxyalkylating novolacs is by reaction with alkylene carbonates such as ethylene carbonate and propylene carbonate, using a catalyst such as sodium or potassium carbonate.

In the preparation of the phenol-aldehyde or phenol-ketone condensation product, there should be at least one hydroxy alkyl group per phenol-aldehye or phenol-ketone molecule. It is preferred that there be at least about one mole or hydroxy-alkylation agent per mole of phenolic hydroxyl. However, products prepared by reaction with a number of units of hydroxyalkylation agent per mole of phenolic hydroxyl are often desired, since the physical properties of polyurethane compositions containing them can be adjusted by controlling the ether chain length. Also the hydroxyl number of the modified phenol aldehyde condensate can be adjusted by controlling the ether chain length. The length of the ether chain also influences the viscosity of the condensation product, as well as the physical properties of the moldable sand compositions ultimately prepared reacting the resin component with an organic polyisocyanate. Generally, it is not desired to react more than 10 moles of the hydroxyalkylation agent per mole of phenolic hydroxyl group. However, up to 25 units of hydroxyalkylation agent per mole of phenolic hydroxyl group can be employed if desired.

The hydroxyalkylated product is now transalcoholated with drying oils, semi-drying oils, and mixtures thereof; with drying oils mixed with non-drying oils; with heat polymerized oils, and with blown oils. From 0.05 to 2 mole of the oil can be used per mole of hydroxyl on the hydroxyalkylated product; the preferred range is about 0.2 to 0.4.

The above mentioned oils may be characterized by the formula

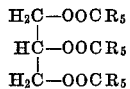

wherein $R_5$ may be a saturated or unsaturated alkyl group of 1 to 22 carbons (but there must be some saturation in at least one of the R's). The preferred oils are linseed oil and castor oil and mixtures thereof. Examples of other drying or semi-drying oils which can be employed in this invention include safflower oil, soybean oil, cotton seed oil, corn oil, otticica oil, tung oil, perilla oil, and the like. Alternatively, the hydroxyalkylated novolac resin can be esterified with either the fatty acids of said drying or semi-drying oils or with alcohols such as glycerine.

The hydroxyalkylated novolac and the drying or semi-drying oil are agitated and heated to the reaction temperature under an inert atmosphere. The reaction can be run at 200° to 300° C.; preferably, it should be run at 230° to 260° C. and an even more preferable range is 240° to 250°. If the hydroxyalkylation was catalyzed by a catalyst containing alkali metal (for example, sodium acetate), no further catalyst need be added. If, however, the hydroxyalkylation step was carried out in the presence of amines, alkali metal hydroxides should be added to complete the reaction. The reaction mixture is held at the reaction temperature for 1 to 2 hours.

The unsaturated petroleum polymer employed in the resinous component of the foundry binder are the normally solid petroleum polymers of the type containing ethylenic unsaturation. While these normally solid petroleum polymers may contain significant amounts of styrene, the aliphatic and alicyclic petroleum polymers having high iodine values are more preferred for foundry applications. Petroleum polymers containing cyclopentadiene or dicyclopentadiene are particularly desirable. Preferably, the polymers have a melting point above about 65.5° C. and more preferably a melting point of a least about 80° C. Petroleum polymers melting at about 83 to about 121° C. are especially preferred. Additionally, it is preferred that these petroleum polymers have an iodine value of at least 100, preferably an iodine value of at least 150, and even more preferably an iodine value of at least 200.

In the preparation of the resinous component of the present binder, the oil modified hydroxyalkylated novolac resin together with the petroleum polymer are mixed with a suitable solvent for the mixture. Suitable solvents include the aromatic hydrocarbons of 6 to 10 carbon atoms such as benzene, toluene, xylene, ethylbenzene, monochlorobenzene and the like. Other suitable solvents include the monoester-monoethers of alkylene glycols of 2 to 10 carbon atoms such as diethylene glycol (Carbitol), ethylene glycol (Cellosolve), propylene glycol, butylene glycol, and the like. Typical solvents of the foregoing class include Cellosolve acetate, methyl Cellosolve acetate, butyl Cellosolve acetate, Carbitol acetate, butyl Carbitol acetate and mixtures thereof. Mixtures of the foregoing classes of solvents can be employed. Auxiliary solvents can be admixed with the foregoing classes of solvents, for example, aliphatic hydrocarbons, such as hexane, octane, mineral spirits petroleum, naphtha, and the like. The resin and polymer are mixed with the solvents until a uniform, homogeneous mixture is formed. The mixing time is generally in the range of 0.5 to 3 hours, preferably in the range of 1 to 2 hours. The solvent is generally employed in a ratio of about 20 to about 60 parts by weight per 100 parts of the mixture of oil modified hydroxyalkylated novolac resin and unsaturated petroleum polymer and preferably in the range from about 25 to about 50 parts by weight of solvent per 100 parts of the mixture. The oil modified hydroxyalkylated novolac resin and petroleum polymer are generally employed so that the resin is about 30 to about 70 weight percent based on the total weight of the mixture of resin and polymer and preferably from about 40 to about 60 weight percent.

Various organic polyisocyanates can be used in preparing the compositions of the invention. Among these isocyanates are 2,4-tolylene diisocyanate, 2,6-tolylene, diisocyanate, and mixtures thereof, and particularly the crude mixtures thereof that are commercially available. Other typical polyisocyanates include methylene-bis-(4-phenyl isocyanate), n-hexyl diisocyanate, 1,5-naphthalene diisocyanate, 1,3 - cyclopentylene diisocyanate, p-phenylene diisocyanate, 2,4,6 - tolylene triisocyanate, 4,4',4''-triphenylmethane triisocyanate. Higher isocyanates are provided by the liquid reaction products of (1) disocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following generalized formula:

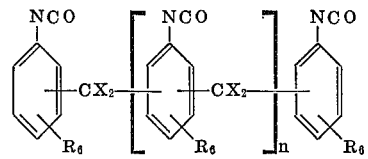

wherein $R_6$ is selected from the group consisting of hydrogen, chlorine, bromine, alkyl having 1 to 5 carbon atoms, and alkoxy having 1 to 5 carbon atoms;

X is selected from the group consisting of hydrogen, alkyl having 1 to 10 carbon atoms and phenyl; and n has an average value of at least 1 and generally about 1 to 3.

A preferred example is polymethylene polyphenylisocyanate.

In some cases, it is desired to blend the resinous component (A) with one or more additional hydroxyl-containing polymeric materials to obtain a further variation in properties. However, the component (A) should comprise at least 50 weight percent of the total hydroxyl-containing components. Such auxiliary hydroxyl-containing polymeric materials can include polyesters, polyethers and mixtures thereof. The polyesters are the reaction products of a polyhydric alcohol and a polycarboxylic compound, said polycarboxylic compound being either an acid, an anhydride, an acid ester or an acid halide. The polyethers are the reaction products of either a polyhydric alcohol or a polycarboxylic acid with a monomeric 1,2-epoxide having a single 1,2-epoxy group.

The following resin formulations are typical hydroxyl-containing polymeric materials that can be used as auxiliary components in the polyurethane compositions of this invention:

Resin A 6 moles 1,4,5,6,7,7-hexachlorobicyclo-(2.2.1)-5-heptene-2,3-dicarboxylic acid
12 moles trimethylolpropane
Acid No. less than 10
Hydroxyl No. 365

Resin B 6 moles adipic acid
10 moles trimethylolpropane
Acid No. less than 1
Hydroxyl No. 504

Resin C

Polypropylene glycol
Molecular weight about 2000

Resin D 4 moles 1,4,5,6,7,7-hexachlorobicyclo-(2.2.1)-5-heptene 2,3-dicarboxylic acid
7.6 moles glycerol
2 moles adipic acid
Acid No. 5
Hydroxyl No. 265

Resin E 3 moles adipic acid
5 moles glycerol
Acid No. 1
Hydroxyl No. 640

Resin F 1 mole trimethylolpropane
6 moles propylene oxide
Hydroxyl No. 392

Resin G 8.8 moles trimethylolpropane
5 moles adipic acid
1 mole phthalic anhydride
Acid No. less than 1
Hydroxyl No. 435

Resin H 1 mole 1,4,5,6,7,7-hexachlorobicyclo-(2.2.1)-5-heptene-2,3-dicarboxylic acid
4 moles propylene oxide
Acid No. 0
Hydroxyl No. 202

Highly useful compositions are also produced by introducing a polyhydric alcohol to the reaction mixture during the preparation of the modified phenol-aldehyde compositions of the invention. The addition of the polyhydric alcohol is preferably made following the preparation of the base phenol aldehyde or phenol-ketone condensate and prior to the introduction of the oxyalkylation agent. Suitable polyhydric alcohols include glycerol, sorbitol, mannitol, pentaerythritol, trimethylol propane, trimethylol ethane, and the like.

In preparing the polyurethane binder compositions of the invention, the components are preferably reacted in a ratio sufficient to provide about 100 percent of isocyanato groups with respect to the total number of hydroxyl, carboxyl and other active hydrogen groups such as carboxylic anhydride, carboxylic acid halide, amine and other groups that are reactive with isocyanato groups. The ratio of components is generally sufficient to provide about 95 to 115 percent of isocyanato groups, so that there is sufficient isocyanate to react with the small quantities of water that may be in contact with the reacting components.

In the preparation of the moldable sand compositions of the invention, foundry sand is placed in a conventional muller or other suitable mixer. The solvated resinous component is introduced to the sand and mixed for 1 to 10 minutes, preferably about 1 to 5 minutes. The sand grains are thereby coated with the resinous component. Thereafter, the polyisocyanate component is introduced to the mixture of sand, and resinous component, and mixing is continued for about 1 to 5 minutes, preferably about 2 to 3 minutes. A portion of the solvent generally evaporates in the muller. The resulting moldable composition is then discharged from the mixing device and introduced into a suitable mold of the desired shape.

In an alternative mixing process, an apparatus known as a "slinger" can be employed. The apparatus comprises two screw conveyors which converge at a common point to discharge the contents of each conveyor into a single screw conveyor for a final mixing operation. In the operation of the process of the invention in such an apparatus, a portion of the foundry sand and the resinous component are introduced into one of the two feed screw conveyors. The polyisocyanate component and the remainder of the foundry sand is introduced into the second of the feed screw conveyors. The two screw conveyors discharge the sand coated with the respective components into the common screw conveyor where all of the reacting components are intimately mixed with the total charge of foundry sand. The resulting moldable composition is discharged into a suitable mold of the desired shape.

In the preparation of the moldable compositions of the invention, the resinous component and the organic polyisocyanate are each employed in a proportion sufficient to provide about 0.5 to 5 weight percent based on the weight of the foundry sand. The proportion is preferably in the range of about 1 to 2.5 weight percent.

The moldable sand compositions of the invention are useful in the preparation of foundry sand cores and foundry sand molds. These products are readily produced by permitting the moldable composition to cure at room temperature, i.e., about 30 degrees centigrade. However, higher and lower curing temperatures can be employed, if desired, from about 10 to about 100 degrees centigrade or higher.

It is within the scope of this invention to additionally employ a convention hydroxyl-isocyanate catalyst such as dibutyltin dilaurate; dibutyltin diacetate; zinc naphthenate; lead naphthenate; cobalt naphthenate; stannous octoate; tertiary amines, which generally contain up to 20 carbon atoms, such as trimethyl amine, triethyl amine, tributyl amine, tripropyl amine, dimethyl-sec-butyl amine, N,N-dimethyl aniline, n-methyl morpholine, tetramethyl guanidine, triethylene diamine; and the like can be present in the resinous component to the extent of about 0.1 to about 5 weight percent based on the total weight of the resinous component, preferably from about 3 to about 5 weight percent.

The following examples illustrate the various aspects of the invention but are not intended to limit it. Where not otherwise specified throughout the specification and claims, temperatures are given in degrees centigrade, parts are by weight, and viscosities are given in Gardner seconds at 50° C.

EXAMPLE 1

A typical modified phenol-aldehyde condensation product prepared by introducing 3,000 parts phenol, 13 parts of oxalic acid catalyst and 6 parts of a wetting agent into a jacketed reactor and heating to 100 degrees centigrade. The anionic wetting agents of alkyl aryl sulfonate type are preferred. 1,110 parts of a 37 percent aqueous formaldehyde solution are added to the reactor at such a rate that the heat of reaction provide a vigorous reflux. Refluxing is continued for two hours after the completion of the formalin addition. The reactor contents are dehydrated at 180 degrees centigrade and then dephenolated at 200 degrees centigrade at 50 millimeters vacuum. Approximately 2,030 parts of phenol-aldehyde condensate are produced. 7.2 parts of sodium hydroxide are introduced to the reactor. Ethylene oxide is then added to the reactor as either a vapor or a liquid. The reactor temperature is maintained at 190 degrees centigrade for the initial two hours and is then permitted to increase to the range of 200 to 220 degrees centigrade until the addition of 878 parts of ethylene oxide is complete. The resulting condensation product has a hydroxyl number of 370, and a Gardner viscosity at 50 degrees centigrade of about 2,000 seconds.

EXAMPLE 2

A typical modified phenol-ketone condensation product is prepared in a manner similar to the method of Example 1 by reacting 3,000 parts phenol, 820 parts acetone under refluxing conditions for four hours in the presence of ten parts of sulfuric acid catalyst and ten parts of alkyl benzene sulfonate wetting agent. After dehydration and dephenolation in the manner of Example 1, ten parts of sodium hydroxide are introduced to the phenol-acetone condensate. Then 900 parts of ethylene oxide are introduced to the reaction mixture which is maintained at 180 to 220 degrees centigrade. The resulting condensation product has a hydroxyl number of 310.

The characteristics of the compositions of Examples 1 and 2 can be drastically changed by varying the ratio of ethylene oxide to phenolic hydroxyl groups, and also by varying the ratio of phenol to aldehyde or ketone in the base condensate. In Examples 3 through 6, the ratio of ethylene oxide to phenolic hydroxyl group was varied from 1.50 to 3.0, while maintaining a ratio of phenol to aldehyde in the base condensate of three to two. In Examples 7 through 9, the phenol to aldehyde ratio was changed to five to four and the ethylene oxide ratio was varied from 1.25 to 1.72. The effects on viscosity, as well as hydroxyl number, of the resulting addition products are shown in Table I. All other conditions in Examples 3 to 9 are the same as those in Example 1.

TABLE I

| Example number | Ratio of phenol to aldehyde in base condensate | Ratio of ethylene oxide to hydroxyl group | Hydroxyl number | Viscosity |
|---|---|---|---|---|
| 1 | 3/2 | 1.0 | 376 | 2,000 |
| 3 | 3/2 | 1.50 | 339 | 335 |
| 4 | 3/2 | 2.0 | 301 | 52 |
| 5 | 3/2 | 2.5 | 267 | 23 |
| 6 | 3/2 | 3.0 | 250 | 13.7 |
| 7 | 5/4 | 1.25 | 340 | 19,500 |
| 8 | 5/4 | 1.50 | 320 | 2,200 |
| 9 | 5/4 | 1.72 | 292 | 545 |

The viscosities and hydroxyl numbers of the condensation products can also be varied by changing the type of alkylene oxide employed while holding both the chain length of the base condensate, as well as of the length of the alkylene oxide side chains constant. In Examples 10, 11, and 12, the method of preparation of Example 5 is repeated except that a portion or all of the ethylene oxide is replaced with propylene oxide. The hydroxyl numbers and viscosities of the resulting addition products are shown in Table II where these values are compared with those obtained in Example 5. Also shown in Example 14 in Table II are the properties of resin prepared as in previous examples, but with different ratios of phenol, formaldehyde and alkylene oxides.

TABLE II

| Example number | Ratio of phenol to aldehyde in base condensate | Ratio of alkylene oxide to hydroxyl group | Hydroxyl number | Viscosity |
|---|---|---|---|---|
| 5 | 3/2 | 2.5 ethylene oxide | 267 | 23 |
| 10 | 3/2 | 2.0 ethylene oxide plus 0.5 propylene oxide | 256 | 21 |
| 11 | 3/2 | 1.73 ethylene oxide plus 0.76 propylene oxide | 257 | 19 |
| 12 | 3/2 | 2.5 propylene oxide | 244 | 31 |
| 13 | 4/3 | 3.5 ethylene oxide plus 3.5 propylene oxide | 200 | (¹) |

¹ 2,500 centipoises at 30° C.

EXAMPLE 14

The resinous component of the present invention was prepared by heating a charge of 50 parts of the hydroxyalkylated novolac resin of Example 5, 40 parts of linseed oil, 10 parts of castor oil and 0.2 parts of sodium hydroxide to 250° C. After 1.5 hours, the transalcoholysis product had a Gardner-Holdt viscosity of 8.5± one second and a refractive index of 1.5087±0.0005. The product was cooled to 150° C. whereupon 50 parts of mineral spirits and 50 parts of petroleum polymer (Velsicol GD-528:100% solids, iodine value of 215 and melting point of about 93° C.) were added and the temperature maintained until the petroleum polymer dissolved. The resinous component was then cooled to 50° C. and 6 parts of cobalt naphthenate, 0.4 parts of stannous octoate and 5 parts of an aromatic amino pentol sold under the trademark "Thanol R-650-X" by Jefferson Chemical Company were added and blended. Nitrogen was bubbled through the reaction mass at all times above described to exclude oxygen. The resulting resinous component had a specific gravity of 0.972, a refractive index of 1.5092, a C.P. viscosity of 210 at 25° C. and an acid number of 5.6.

EXAMPLE 15

A charge of 1.5 weight percent of the resinous component of Example 14 was added to 100 parts of foundry sand in a conventional muller for 2 minutes. Thereafter, 20 weight percent of polymethylene polyphenylisocyanate based on the weight of the resinous component was added and mixing was continued for 2 minutes. The resulting mixture was then discharged from the muller. The resin-sand mixture was tested for "deep-set time" immediately following discharge from the muller. In this test, a portion of the resin sand mixture is discharged into a pail. A thermometer is inserted in the resin mixture and the time at which the thermometer can no longer be pushed deeper into the sand resin mixture is observed. For the material prepared in this example, the deep-set time was 75 minutes.

Molded articles were prepared after the resin sand mixture had been discharged from the muller for the times specified in Table III. The articles were cured at ambient temperature, i.e., about 30° C. for 24 hours. At the end of the 24 hour curing time, the molded articles were tested and were found to have the tensile strengths specified in Table III. The articles had a scratch hardness of 92-97. The scratch hardness test was conducted as described in the Foundry Sand Handbook, seventh edition, American Foundry Society Publication No. 12, using a Dietert No. 373 tester. A scratch hardness value of 75 is acceptable to the foundry industry.

TABLE III

| Time article molded after discharge from muller, minutes | Tensile strength, p.s.i. |
|---|---|
| 5 | 212 |
| 10 | 195 |
| 15 | 150 |
| 20 | 133 |
| 30 | 94 |

EXAMPLE 16

A foundry core was prepared according to the procedure of Example 15 except that the resinous component was employed at a 2 weight percent level. The core was subjected to a Dilatometer test. In this test, the foundry core is maintained in a 815.5 degrees centigrade atmosphere, a load is applied thereto and the time required for the core to collapse is measured. In this test, the load applied was 25 pounds and the core collapsed after 0.97 minutes.

EXAMPLE 17

Example 16 was repeated except that the load applied in the Dilatometer test was 50 pounds. The core collapsed after 14 seconds.

A second core was prepared according to the foregoing procedure employing as the resinous component of the binder a mixture of 47 parts of oil modified alkyd, 29 parts of the petroleum polymer and 24 parts of mineral spirits. The oil modified alkyd was prepared from 64 parts of linseed oil, 15 parts of pentaerythritol and 21 parts of isophthalic acid. A mixture of cobalt naphthenate and dibutyltin dilaurate was added to the resinous component as a catalyst. The resinous component and a di- and triphenyl methane, di- and triisocyanate sold under the trademark "Mondur MR" by the Mobay Chemical Company was mixed with the sand. The resulting core was subjected to the Dilatometer test at a 50 pound load and was observed to collapse after 21 seconds. Thus, the core which employed the oil modified alkyd in the binder required 50 percent longer to collapse than the core employing a binder of this invention.

The sand employed in the example contained one percent of brown iron oxide.

EXAMPLE 18

Example 17 was repeated except that the sand did not contain any brown iron oxide. The core employing the binder of this invention collapsed after 37 seconds and the core employing the oil modified alkyd in the binder collapsed after 118 seconds. Thus, the core which employed the alkyd in the binder required about 320 percent longer to collapse than the core employing the binder of this invention.

iodine number of 103 and acid number of 0.7. Fifty parts of the resin and 25 parts of petroleum polymer sold under the trademark "Velsicol GD-528" by the Velsicol Chemical Company were dissolved in 25 parts of mineral spirits at about 80° centigrade. This was then cooled to below 50° centigrade and 2.4 parts of 6 percent cobalt naphthenate and 0.1 part of dibutyltin dilaurate were added and blended. The resulting resinous component A had a Brookfield viscosity at 25° centigrade of 185 cps.

Resinous components B, C, D, E, and F were prepared in a similar manner to the foregoing except for the following:

In resinous component B, the charge was 30 parts of the resin of Example 5, 30 parts of linseed oil, 10 parts of castor oil and 30 parts of tall oil sold under the trademark "Unitol R" by the Union Bag and Paper Company (49 percent of tall oil fatty acids, 43 percent resin acids) which was heated for one hour under vacuum to yield a product having a reactivity number of 83, iodine number of 100 and acid number of 12.9.

In resinous component C, the charge contained 37 parts of the resin of Example 5, 47 parts of linseed oil, 11 parts of castor oil and 5 parts of isophthalic acid and was heated for 4 hours to yield a resin having a reactivity number of 95, an iodine number of 96, and an acid number of 2.8.

In resinous component D, the charge contained 40 parts of the resin of Example 5, 35 parts of linseed oil, 10 parts of castor oil, 5 parts of isophthalic acid and 10 parts of tall oil and the charge was heated for 4 hours to yield a product having a reactivity number of 101, an iodine number of 91 and an acid number of 4.9.

In resinous component E, the charge contained 35 parts of the resinous component of Example 5, 45 parts of linseed oil, 10 parts of castor oil and 10 parts of chlorendic acid which was heated for 4 hours to yield a product having a reactivity number of 106, an iodine number of 90 and an acid number of 2.7.

In resinous component F, the charge was 40 parts of a hydroxypropylated phenol-formaldehyde resin (prepared in accordance with Examples 1–9 and having a ratio of phenol to aldehyde in the base condensate of 4/3 and a hydroxyl number of 206), 50 parts of linseed oil, 10 parts of castor oil, and the charge was heated at 300° centigrade for one hour under vacuum to yield a resin having a reactivity number of 80, an iodine number of 86, and an acid number of 3.7.

Molded foundry cores were prepared with each of the resinous compositions A–F employing Manley 515 sand according to the procedure of Example 15. The ratios of resinous components, polyisocyanate (Mondur MR), deep-set time, scratch hardness and tensile strengths are reported in Table IV.

TABLE IV

| Resinous component | Resinous component, parts/ 10,000 sand | Isocyanate, parts/100 resinous component | Deep set time, minutes | Scratch hardness | Tensile strength of articles molded | | | | |
|---|---|---|---|---|---|---|---|---|---|
| | | | | | 5[1] | 10[1] | 15[1] | 20[1] | 30[1] |
| A | 163 | 37 | 75 | 95 | 295 | 259 | 248 | 239 | 236 |
| B | 172 | 28 | 170 | 90–95 | 265 | 250 | 233 | 219 | 195 |
| C | 170 | 30 | 150 | 94 | 248 | 264 | 246 | 219 | 184 |
| D | 168 | 32 | 90 | 90 | 230 | 234 | 219 | 206 | 163 |
| E | 167 | 33 | 210 | 90 | 271 | 260 | 253 | 241 | 211 |
| F | 172 | 28 | 120 | 85–90 | 208 | 206 | 177 | 182 | 171 |

[1] Minutes after discharge from muller.

EXAMPLE 19

Six resinous components (resin-petroleum polymer-solvent) were prepared as follows: Resinous component A was prepared by heating a charge of 40 parts of the hydroxyethylated novolac resin of Example 5, 50 parts of linseed oil, and 10 parts of castor oil to 250° centigrade for 5 hours under nitrogen. The resinous product had a Brookfield viscosity at 25° centigrade of 1580 cps., reactivity number of 128 milligrams KOH per gram,

EXAMPLE 20

A resinous component of the present invention was prepared by heating a charge of 30 parts of the hydroxyethylated resin of Example 5, 30 parts of linseed oil, 30 parts of tall oil and 10 parts of castor oil to 250° C. for 5 hours under nitrogen. The resulting resin and 50 parts of petroleum polymer sold under the trademark "Velsicol GD-528" by the Velsicol Chemical Company were dissolved in 50 parts of mineral spirits at about 80° centigrade. This was then cooled to below 50° centigrade and 7.5 parts of 6% cobalt naphthenate was added and blended. Molded articles were prepared according to the procedure of Example 15 employing 100 parts of Wedron 7020 sand, 1.5 parts of the resinous component based on the sand and 0.3 part of polymethylene polyphenylisocyanate. The deep set time of the sand-resin mixture was determined to be 100 minutes and the scratch hardness of the molded articles was determined to be 95–100. The tensile strengths are given in Table V.

TABLE V

| Time article molded after discharge from muller, minutes: | Tensile strength, p.s.i. |
|---|---|
| 5 | 212 |
| 10 | 187 |
| 15 | 130 |
| 20 | 129 |
| 30 | 108 |

While this invention has been described with reference to certain specific embodiments, it will be recognized by those skilled in the art that many variations are possible without departing from the spirit and scope of the invention.

We claim:

1. A foundry binder having improved breakdown properties comprising (A) a resinous component comprising a mixture of (1) an oil-modified hydroxyalkylated phenolic novolac resin, (2) an ethylenically unsaturated petroleum polymer having a melting point above about 65.5 degrees centigrade and an iodine value of at least 100 and (3) a solvent for the mixture, and (B) an organic polyisocyanate.

2. The foundry binder of claim 1 wherein said oil modified hydroxyalkylated phenolic novolac resin is the transalcoholated product of a hydroxyalkylated phenolic resin of the formula:

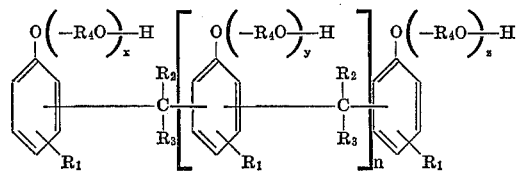

wherein $n$ has an average value of about 0.2 to 6; $x$, $y$, and $z$ are integers from 1 to about 25; $R_1$ is independently selected from the group consisting of hydrogen, fluorine, chlorine, bromine, hydrocarbon radical, hydrocarbon ketone radical and hydrocarbon carboxylic radicals; $R_2$ and $R_3$ are independently selected from the group consisting of hydrogen, a hydrocarbon radical and a halogen substituted hydrocarbon radical; and $R_4$ is a radical derived from a compound selected from the group consisting of a monooxirane ring compound, an alkylene halohydrin and an alkylene carbonate by an oxyalkylation reaction.

3. The foundry binder of claim 2 wherein said oil is selected from the group consisting of linseed oil and mixtures of linseed oil and castor oil.

4. The foundry binder of claim 2 wherein said organic polyisocyanate is a polyaryl polyisocyanate comprising polymethylene polyphenylisocyanate.

5. The foundry of claim 2 wherein said ethylenically unsaturated petroleum polymer contains cyclopentadiene or dicyclopentadiene.

6. The foundry binder of claim 3 wherein said petroleum polymer has a melting point above about 65.5° centigrade and an iodine value of at least 100.

7. The binder of claim 6 which additionally contains a hydroxyl-containing polymeric material selected from the group consisting of polyesters comprising the reaction products of a polyhydric alcohol and a polycarboxylic compound, polyethers comprising the reaction product of a polyhydric alcohol with a monomeric 1,2-epoxide having a single 1,2-epoxy group or the reaction product of a polycarboxylic acid with a monomeric 1,2-epoxide having a single 1,2-epoxy group, and mixtures thereof.

References Cited

UNITED STATES PATENTS

| 3,134,682 | 5/1964 | Vogel et al. | 260—19 |
| 3,499,861 | 3/1970 | Kujawa et al. | 260—19 |
| 3,533,972 | 10/1970 | Pawlak | 260—19 |

DONALD E. CZAJA, Primary Examiner

W. E. PARKER, Assistant Examiner

U.S. Cl. X.R.

260—77.5

PO-1050
(5/69)

UNITED STATES PATENT OFFICE
CERTIFICATE OF CORRECTION

Patent No. 3,686,106                                      Dated August 22, 1972

Inventor(s) Richard B. Tideswell et al.

It is certified that error appears in the above-identified patent and that said Letters Patent are hereby corrected as shown below:

Column 1, line 23, "foundaries" should read ---foundries---; Column 1, line 61, "hydroxylated" should read ---hydroxyalkylated---. Column 3, line 54, "aldehyde" should read ---aldehydes---. Column 4, line 1, "pehnol" should read ---phenol---; line 18, after "method" insert ---of---; line 52, "hydroxylalkylation" should read ---hydroxyalkylation---; line 66, "Suitabe" should read ---Suitable---. Column 6, line 41, "disocyanates" should read ---diisocyanates---, and insert the following claim:

> 8. The foundry binder of Claim 1 wherein said oil-modified hydroxyalkylated phenolic novolac resin is in the proportion of about 30 to about 70 weight percent based on the total weight of the mixture of said resin and said ethylenically unsaturated petroleum polymer.

In the heading to the printed specification, line 9, "7 Claims" should read -- 8 Claims --.

Signed and sealed this 10th day of April 1973.

(SEAL)
Attest:

EDWARD M.FLETCHER,JR.                           ROBERT GOTTSCHALK
Attesting Officer                               Commissioner of Patents